US007076731B2

(12) United States Patent
Brill et al.

(10) Patent No.: US 7,076,731 B2
(45) Date of Patent: Jul. 11, 2006

(54) SPELLING CORRECTION SYSTEM AND METHOD FOR PHRASAL STRINGS USING DICTIONARY LOOPING

(75) Inventors: Eric D. Brill, Redmond, WA (US); Robert Rounthwaite, Fall City, WA (US); Raman Chandrasekar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 09/681,771

(22) Filed: Jun. 2, 2001

(65) Prior Publication Data

US 2003/0037077 A1 Feb. 20, 2003

(51) Int. Cl.
*G06N 3/00* (2006.01)
(52) U.S. Cl. ...................................... 715/533
(58) Field of Classification Search ................ 715/533, 715/500, 517, 523, 530, 513
See application file for complete search history.

(56) References Cited

U.S. PATENT DOCUMENTS

| 5,095,432 | A | * | 3/1992 | Reed ............................ 704/9 |
| 5,258,909 | A | * | 11/1993 | Damerau et al. ........... 715/533 |
| 5,577,249 | A | * | 11/1996 | Califano .................... 707/100 |
| 5,649,222 | A | * | 7/1997 | Mogilevsky ................ 715/533 |
| 5,659,771 | A | * | 8/1997 | Golding ...................... 715/533 |
| 5,787,451 | A | * | 7/1998 | Mogilevsky ................ 715/533 |
| 5,812,863 | A | * | 9/1998 | Ishikawa .................... 715/533 |
| 6,018,736 | A | * | 1/2000 | Gilai et al. ..................... 707/6 |
| 6,023,760 | A | * | 2/2000 | Karttunen ................... 712/300 |
| 6,047,300 | A | * | 4/2000 | Walfish et al. ............. 715/533 |
| 6,085,206 | A | * | 7/2000 | Domini et al. ............. 715/533 |
| 6,131,102 | A | * | 10/2000 | Potter ......................... 715/533 |
| 6,616,704 | B1 | * | 9/2003 | Birman et al. ............. 715/533 |
| 6,772,150 | B1 | * | 8/2004 | Whitman et al. ............. 707/6 |
| 2002/0087604 | A1 | * | 7/2002 | Bernth et al. ............... 707/533 |

OTHER PUBLICATIONS

"Google Friends Newsletter for May 23, 2001", <www.google.com/googlefriends/may2001.html>, pp. 2-3.*
Dictionary.com "Roman Empire," "holy cow," "Marilyn Monroe," pp. 1-3.*

(Continued)

*Primary Examiner*—Stephen Hong
*Assistant Examiner*—Kyle Stork
(74) *Attorney, Agent, or Firm*—Lyon & Harr, L.L.P.; Craig S. Fischer (57) ABSTRACT

A spelling correction system and method for phrasal strings using a dictionary looping technique. The method of the present invention includes spelling correction of an input phrasal string by segmenting the string into a plurality of different segmentations, comparing each segmentation to dictionary entries using the dictionary looping technique, assigning a cost to each segmentation, and determining an output string by finding the segmentation having the lowest cost. The dictionary looping technique determines compares each segmentation to dictionary entries by performing a looping search through a phrasal dictionary data structure in a looping manner whereby a number of different searches are performed. Dictionary looping allows the dictionary to be compact because the dictionary need not include all potential combinations of all possible phrases that could be encountered. The present invention also includes a phrasal spelling correction system and a dynamic dictionary that uses the above-described method.

24 Claims, 7 Drawing Sheets

OTHER PUBLICATIONS

"Kleene Star," <http://www.free-definition.com/Kleene-star.html>, pp. 1-2.*

"String," <http://www.free-definition.com/Stringr.html>, pp. 1-2.*

"ASCII," <<http://www.free-definition.com/ASCII-character-set.html>, pp. 1-9.*

Brill, E. and Moore, R.: An improved error model for noisy channel spelling correction, *Proceedings of the Conference of the Association for Computational Linguistics*, 2000.

Church, K. and Gale, W.: "Probability scoring for spelling correction," *Statistics and Computing* 1, pp. 93-103, 1991.

Levenshtein, V.: "Binary codes capable of correcting deletions, insertions and reversals," *Soviet Physics Doklady* 10, 10, pp. 707-710, 1966.

Mays, E., Damerau, F., and Mercer, R.: "Context based spelling correction," *Information Processing and Management*, vol. 27, No. 5, pp. 512-522, 1991.

* cited by examiner

SPELLING CORRECTION SYSTEM AND METHOD FOR PHRASAL STRINGS USING DICTIONARY LOOPING

BACKGROUND OF INVENTION

1. Field of the Invention

The present invention relates in general to computer-implemented spelling correction and more particularly to a spelling correction system and method for phrasal strings, such a search string used in a search engine query.

2. Related Art

Spelling correction (or spell checking) is a widely used tool in computer applications (such as word processing applications) that verifies the correct spelling of words in written documents. A typical spelling correction technique works by encountering a word that is not in a dictionary of words (e.g. a potentially misspelled word to be checked). The potentially misspelled word is compared to words in the dictionary and the word representing the closest match is returned as the correct spelling of the word. Current spelling correction techniques were developed for spelling correction of text documents and identify words within the text by determining where spaces occur. In other words, a word within the text document is identified as a space-delimited string. In general, a space-delimited string includes a string of letters that is set apart by spaces or punctuation characters. This means that current spelling correction techniques consider the letters between the spaces (i.e. a space-delimited string) to be a "word".

There are numerous spelling correction techniques currently available. For example, some existing spell spelling correction techniques are based on a framework that allows a spelling provider to manually specify the allowable edit types and the weights that are associated with each edit. Other types of existing spelling correction techniques use context to determine the correct word and first pre-compute a set of edit-neighbors for every word within the dictionary. In these edit-neighbor techniques, a word is an edit-neighbor of another word if the word can be derived from the other word in a single edit. In this situation, an edit is defined as a single letter insertion, substitution or deletion, or a letter-pair transposition. For every word in a document, the edit-neighbor technique determines whether any edit-neighbor of a word is more likely to appear in that context than the word that was typed. All edit-neighbors of a word are assigned equal probability of having been the intended word, and then the context is used to determine which word to select. Still another type of spelling correction technique computes the probability of an intended word w given a string s by automatically deriving probabilities for all edits. Similar to the edit-neighbor technique, this probabilistic technique pre-computes a set of allowable edits and only considers words w that are a single edit away from string s. Yet another spelling correction technique is a learning string edit technique that learns the probabilities for all edits, where edits are limited to single character insertion, deletion and substitution. This learning string edit technique allows for a string s to be derived from a word w by any number of edits.

All of these spelling correction techniques were developed with text document processing in mind. These techniques do not work well, however, when they are applied to strings of misspelled words. These strings are typically phrases and are known as phrasal strings. A phrasal string is a string of characters that is not necessarily space-delimited or punctuation-delimited. In other words, the string is not necessarily delimited wherever spaces occur. An error-filled phrasal string may contain unreliable spaces and many nonstandard words. For purposes of this application, non-standard words include words that are not contained in a standard dictionary or that may have a different meaning than commonly assigned to the words. By way of example, a search engine generally has a type-in text box whereby a phrasal string may by entered by a user. Spelling correction is important for search engines because since most queries are short even a single misspelled word or misplaced space will be extremely problematic, and can lead to highly erroneous results. Current spelling correction techniques, however, perform poorly when used for spelling correction in applications using phrasal strings. This is because current techniques perform spelling correction based on space-delimited strings and are unreliable and ineffective in situations where a user is typing a phrasal string (such as a search engine query) and accidentally inserts or omits a space.

By way of example, assume that a user inputs a line of text into a search engine query that contains the misspelled phrase "the backs treetboys". If one of the current spelling correction techniques is used to spell correct the textual line, then when the misspelled phrase is encountered the spelling correction technique will determine whether each space-delimited string (i.e. "the", "backs" and "treetboys") is in the dictionary. Because the space-delimited strings "the" and "backs" are in the dictionary, the spelling correction technique will assume them to be correctly spelled. Moreover, because the space-delimited string "treetboys" is not in the dictionary, the spelling correction technique will assume that the string is misspelled and search for the closest match in the dictionary. It is likely that a close match will not be found and the response such as "Not in Dictionary" will be returned to the user. This can be especially frustrating to a user who had intended to enter in the query box of the search engine the phrase "the backstreet boys" and accidentally added a space at a wrong location.

Another problem with using current spelling correction techniques in a search engine environment is that a dictionary is difficult to define. This is because some terms (especially proper names) used in search engine queries do not occur in standard dictionaries. Another problem is that the concept of a word is much looser in a search engine query (as compared to a word processing application) and users will often omit spaces between words. Still another problem is that case information is considerably less reliable in a search engine query than with a word processing application. This makes it difficult to know whether a potentially incorrect word not found in the dictionary is a proper name or a misspelled word. Because current spelling correction techniques use a dictionary containing only single words (or space-delimited strings), these existing techniques are ineffective when applied to phrasal strings.

Still another problem with using current spelling correction techniques for phrasal strings is that the word dictionary used by current spelling correction techniques is essentially static while phrasal strings used in search queries are dynamic. Existing techniques use a static dictionary containing words (or space-delimited strings) for a certain language (such as English). There is no need for the dictionary to be constantly updated because new words are added to the language and old words fall out of use relatively slowly over a long period of time. Over a reasonable period of time, therefore, a dictionary for a language can be considered static. Conversely, phrasal strings used in search queries are quite dynamic, with the probability of certain phrases being used in a query varying widely from one day to the next. For example, if a major world event suddenly occurred then phrases pertaining to that event would be used often. On the other hand, a week later the phrases pertaining to that event may be old news and replaced with phrases corresponding to a more current event. In addition, search engine query terms often include jargon that does not have the standard dictionary meaning. A static dictionary cannot update itself to reflect current high-use search phrases and new meanings for words.

What is needed, therefore, is a system and method for spelling correction that is capable of operating on phrasal strings and is not limited to a single word or space-delimited text. The spelling correction system and method must be effective for spell correcting phrasal strings and such that the problem of erroneous insertions and deletions of spaces in a phrasal string can be overcome. Moreover, what is needed is a spelling correction system and a method that contains a phrasal dictionary containing entries that can be arbitrary word strings and phrases instead of merely single word entries. In addition, what is needed is a phrasal dictionary that is dynamic and is capable of being updated to include high-use phrases and words.

SUMMARY OF INVENTION

To overcome the limitations in the prior art as described above and other limitations that will become apparent upon reading and understanding the present specification, the present invention includes a spelling correction system and method for spelling correction of phrasal strings. A phrasal string is a string of characters that may cross word boundaries and does not necessarily use spaces to define the limits of the string. For example, similar to a space-delimited string a phrasal string may contain single words (such as "employment") but in addition may contain multiple words (such as "employment in Arkansas"). The present invention facilitates spelling correction of entire phrasal strings rather than simply using spelling correction of space-delimited input strings. A misspelled phrasal string is segmented into a plurality of segmentations and a novel looping process through the dictionary is used to determine a segmentation having a lowest cost. A corrected segmentation corresponding to a segmentation having a lowest cost is designated as the most probable correct spelling of the phrasal string. In a preferred embodiment the dictionary of the present invention is a phrasal dictionary containing both single words and strings of words. Moreover, the phrasal dictionary of the present invention is dynamic such that phrasal strings and words used frequently are added to the dictionary. Current spelling correction techniques are based on single words and typically compare these single words to a static generic dictionary containing single word entries.

In general, the spelling correction system of the present invention includes a phrasal dictionary containing phrasal strings (single and multiple word strings) and a looping comparator that performs a novel looping process through the phrasal dictionary to correct the segmentation by determining a best match. The phrasal dictionary includes entries in a data structure and the looping comparator uses the novel looping process of the present invention to compare sub-strings of the segmentation with the dictionary entries. In a preferred embodiment, the phrasal dictionary includes a dynamic update module that provides dynamic updating of dictionary entries such that phrasal strings and words used frequently are added to the dictionary. The system of the present invention also includes a segmentation module that segments an input string into a plurality of different segmentations, with each segmentation containing contiguous sub-strings. These sub-strings are used by the looping comparator to search the dictionary and correct the segmentation. The system of the present invention also includes a hierarchical module that provides the criteria (a set of hierarchical parameters) by which the looping comparator determines what constitutes a best match between the input string and an entry in the dictionary. These hierarchical parameters include, for example, the length of the dictionary entry and a probability of the dictionary entry given the context of neighboring words.

The present invention also includes a method for spelling correction of a phrasal string using a novel dictionary looping technique. The method includes segmenting a phrasal string into a plurality of segmentations containing sub-strings. Each sub-string is compared to corresponding dictionary entries to determine a closest match. Preferably, this comparison is performed using a dictionary looping technique. Dictionary looping allows the dictionary to be compact because the dictionary need not include all potential combinations of all possible phrases that could be encountered. The dictionary looping technique searches for a best match entry in a dictionary by looping through a dictionary data structure containing the dictionary entries. Based on this comparison of the sub-strings to dictionary entries, a cost is assigned to each of the segmentations. The dictionary entry corresponding to the segmentation having the lowest cost is designated as the corrected phrasal string.

The dictionary looping technique includes performing a number of different searches through the dictionary data structure. Each search begins at a starting node and different searches are performed by continually looping back to the starting node. An entry in the dictionary entry corresponding to the segmentation having a lowest cost is designated as the output string and by definition as the most probable correct spelling of the input phrasal string. Determining the dictionary entry having the lowest cost may also include using hierarchical parameters. These hierarchical parameters include, for example, the length of the dictionary entry and a probability of the dictionary entry. The method of the present invention also includes dynamically updating entries in the dictionary to contain the most frequently used phrasal strings entered by a user. By way of example, these current phrasal strings may be the most popular phrasal strings over a period of time.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention includes a spelling correction system and method for phrasal strings using dictionary looping. The present invention is especially useful in applications such as search engine queries that operate on phrasal strings entered by a user. In these applications the phrasal string may include a string of characters having a high percentage of words not appearing in a standard dictionary, a high spelling error rate, unreliable spacing, and certain phrases that are typed frequently. Current spelling correction techniques are ineffective in these applications because these techniques use a static dictionary and operate on space-delimited strings. In particular, existing spelling correction techniques assume that each word in a text is separated by spaces and identify individual words based on the location of these spaces. Each identified word in the space-delimited string is then compared to a single word entry in the static dictionary.

The present invention overcomes these limitations of existing spelling correction techniques. In particular, the spelling correction system and method of the present invention allows multiple possible segmentations of an input string, not just segmentation based on the location of spaces. These segmentations contain sub-strings that may contain a plurality of words and spaces. The sub-strings are compared to entries in a phrasal dictionary. The phrasal dictionary may contain not only single words but also phrases (including spaces). By comparing the sub-strings to entries in the phrasal dictionary, the present invention is capable of resolving spelling errors due to erroneous insertion and deletion of spaces. Moreover, the present invention is also able to use contextual information as appropriate to perform spelling correction. For example, using contextual information, the present invention is able to correct the entire incorrect query, "the backstreet toyz" with "the backstreet boys" instead of merely replacing "toyz" with "toys".

Although the present invention may be used for spelling correction of both long text entries and short text entries, generally the present invention will more frequently be used to address the problem of spelling correction of short text entries. A prototypical example of this is a search engine query box. A misspelled query to a search engine can result in a user not obtaining the desired information. This can result in user frustration, lost revenue and increased cost. Spelling correction is an important tool for search engines for at least two reasons. First, the human error rate in typing search queries is much higher than the error rate in document preparation using a word processor (up to 15% by some estimates). Second, since most queries are very short, a single mistyped word or misplaced or omitted space often will result in an unproductive search.

II. General Overview

Figure 1:
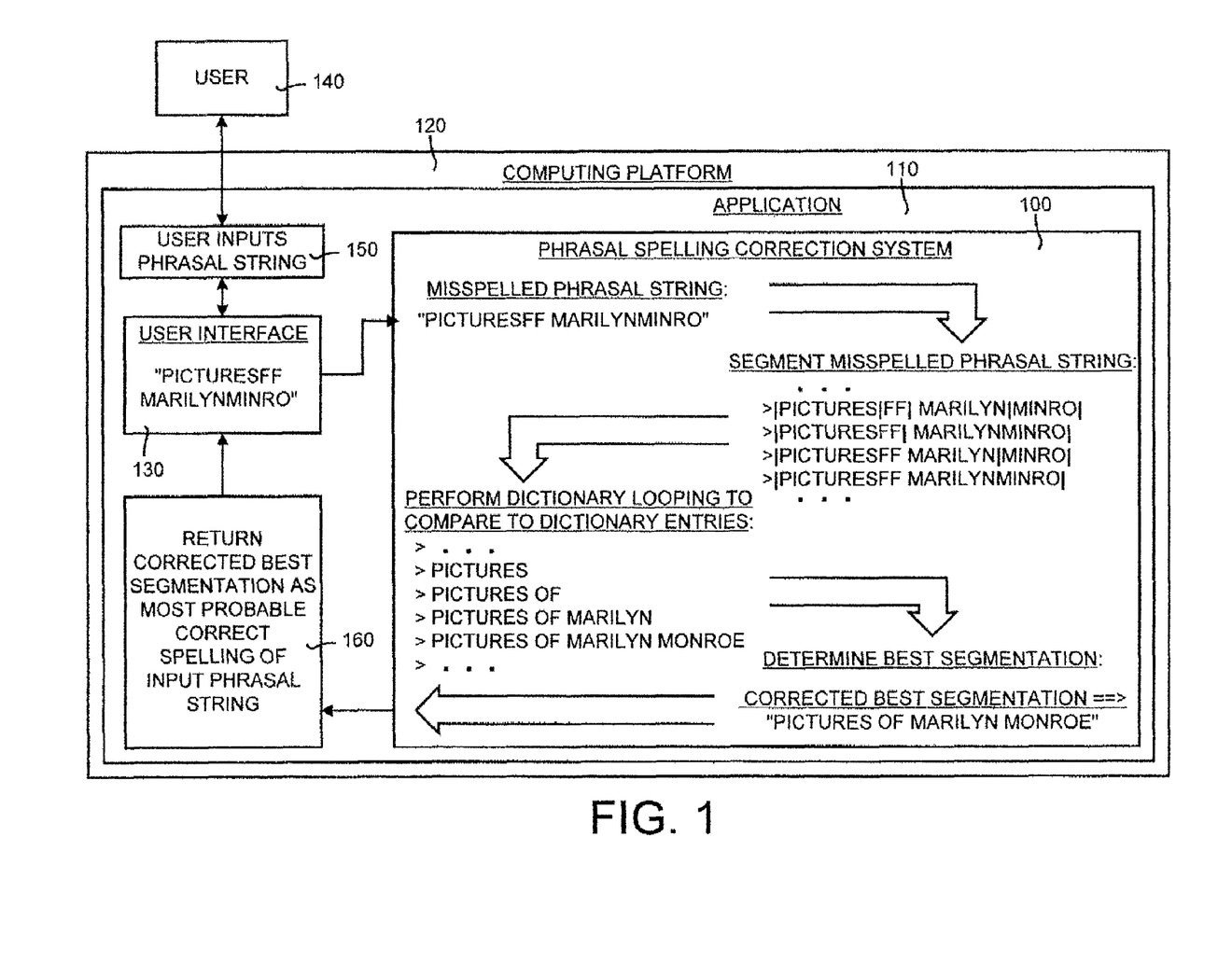
FIG. 1 is an overall block diagram illustrating an implementation of the phrasal spelling correction system of the present invention and is provided for illustrative purposes only.

FIG. 1 is an overall block diagram illustrating an implementation of the phrasal spelling correction system 100 of the present invention and is provided for illustrative purposes only. In general, the phrasal spelling correction system 100 is a part of an application 110 (such as a search engine) residing on a computing platform 120. The application 110 also includes a user interface 130 (such as a graphical user interface) whereby a user 140 is able to interact with the application 110. The user 140 uses an input device (such as a keyboard (not shown)) to input a phrasal string (box 150) into the application 110. As shown in FIG. 1, the phrasal string is displayed in the user interface 130 (such as in an edit or query box). In this case, the intended phrasal string to be entered in the user interface 130 is "pictures of marilyn monroe". Instead, however the user 140 left out a couple of spaces, misspelled a couple of words and instead entered the phrasal string "picturesff marilynminro".

Either upon request by the user 140 or automatically, the application 110 calls the phrasal spelling correction system 100 to spell correct the phrasal string that the user 140 has typed in the user interface 130. As shown in FIG. 1, the misspelled phrasal string is received by the system 100 as "picturesff marilynminro". A traditional spelling correction technique based on space-delimited strings examines the input phrasal string and divides the misspelled string into "words" bounded by spaces. In this case, traditional spelling correction techniques would determine that the words "picturesff" and "marilynminro" are misspelled. Traditional spelling correction techniques would return "pictures" as a probable correct spelling for "picturesff" and probably no suggestion for "marilynminro". This would leave the phrase "pictures marilynminro" in the search query box. This phrase would not be an effective search query when desiring pictures of Marilyn Monroe. Thus, traditional spelling correction techniques would be ineffective in this situation.

As shown in FIG. 1, the phrasal spelling correction system 100 of the present invention segments the entire misspelled phrasal string into a plurality of segmentations containing sub-strings. These segmentations may be for any possible segmentation of the phrasal string, and are not restricted to text between spaces. In FIG. 1, the misspelled phrasal string "picturesff marilynminro" is shown segmented into segmentations that include: (1) /pictures/ff/ marilyn/minro/; (2) /picturesff/marilynminro/; (3) /picturesff marilyn/minr It should be noted that the bolded vertical line "/" indicates where the segmentation of the misspelled phrasal string occurs. A sub-string is the string between the vertical lines.

For each segmentation, each sub-string in the segmentation is compared to entries in a phrasal dictionary. This comparison is used to determine which entry is a closest match to the sub-string being examined. For example, in the first segmentation, /pictures/ff/marilyn/minro/, the sub-strings "pictures", "ff", "marilyn" and "minro" are compared to entries in the phrasal dictionary. Although the sub-strings "pictures" and "marilyn" would be found in the phrasal dictionary, finding an entry that was close to the sub-strings "ff" or "minro" would be difficult. For the second segmentation, /picturesff/marilynminro/, the sub-string "picturesff" would be a close match with the entry in the phrasal dictionary "pictures of". In fact, this match would be a better match than trying to match the sub-string "ff" with the dictionary entry "of". For the third segmentation, /picturesff marilyn/minro/, the sub-string "picturesff marilyn" would be a close match with the phrasal dictionary entry "pictures of marilyn". Finally, the fourth segmentation, /picturesff marilynminro/, is a close match with the phrasal dictionary entry "pictures of marilyn monroe".

As explained in detail below, the closest (or "best") match for each sub-string in a particular segmentation is determined by looping through the phrasal dictionary and comparing each sub-string to dictionary entries. The best match is defined as the match having the lowest cost, or the lowest cost of correction. In the example shown in FIG. 1, the match between the fourth segmentation, /picturesff marilynminro/, and the phrasal dictionary entry "pictures of marilyn monroe" has the lowest cost of correction and is the best match. Next, the cost of correcting each segmentation is added and the segmentation is assigned a cost. The segmentation having the lowest cost is the best segmentation, and the corrected segmentation is the designated as the most probable correct spelling of the input phrasal string. This corrected segmentation is returned (box 160) to the application 110.

Figure 2:
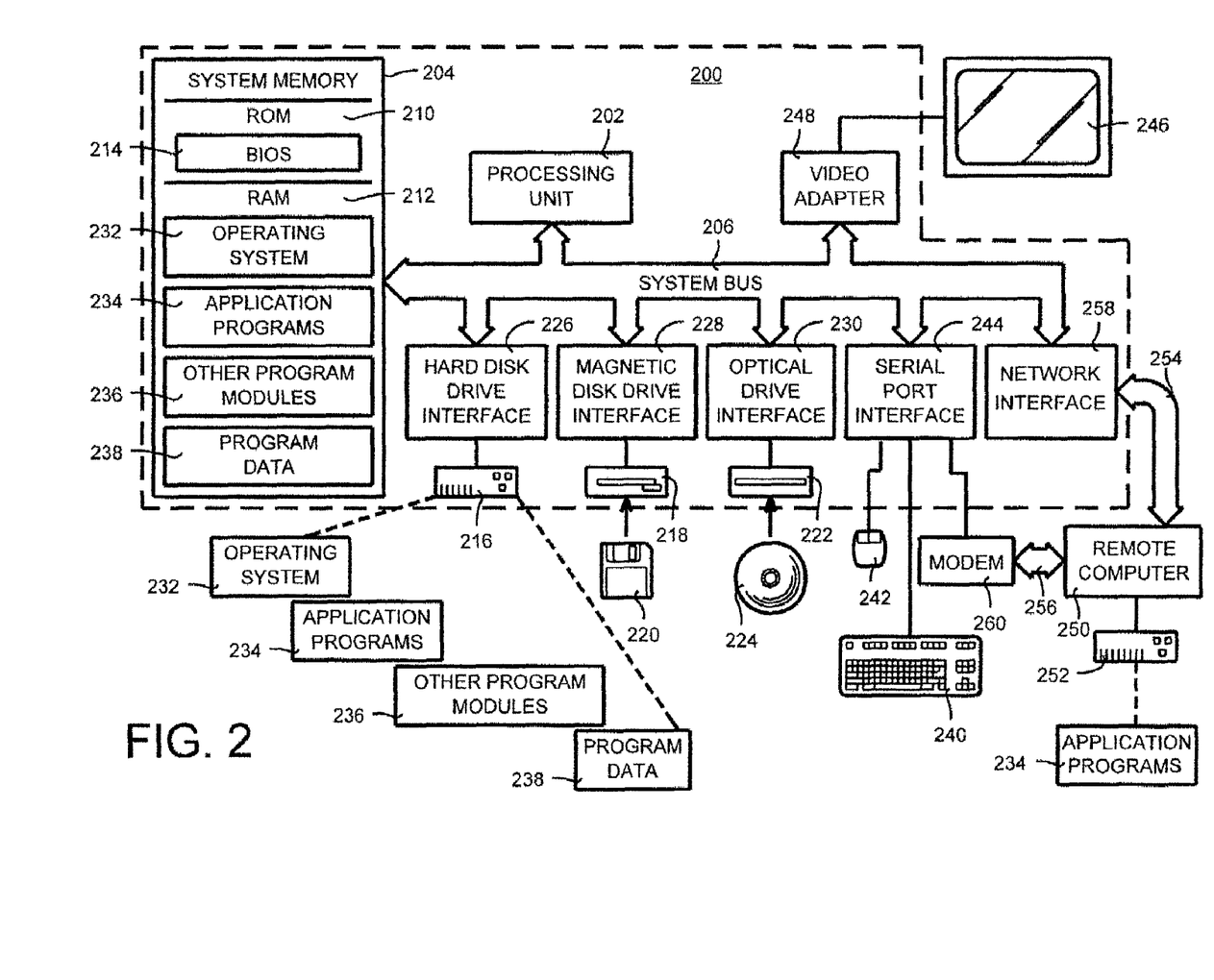
FIG. 2 is a general block diagram illustrating a computing platform as shown in FIG. 1 that preferably may be used to carry out the present invention.

In a preferred embodiment, the computing platform 120 is a computing machine (or device) in a computing environment. FIG. 2 is a general block diagram illustrating the computing platform 120 as shown in FIG. 1 that preferably may be used to carry out the present invention. FIG. 2 and the following discussion are intended to provide a brief, general description of a suitable computing environment in which the spelling correction system and method of the present invention may be implemented. Although not required, the present invention will be described in the general context of computer-executable instructions (such as program modules) being executed by a computer.

Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

Referring to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a camera, a microphone, a joystick, a game pad, a satellite dish, a scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. Components of the Invention

Figure 3:
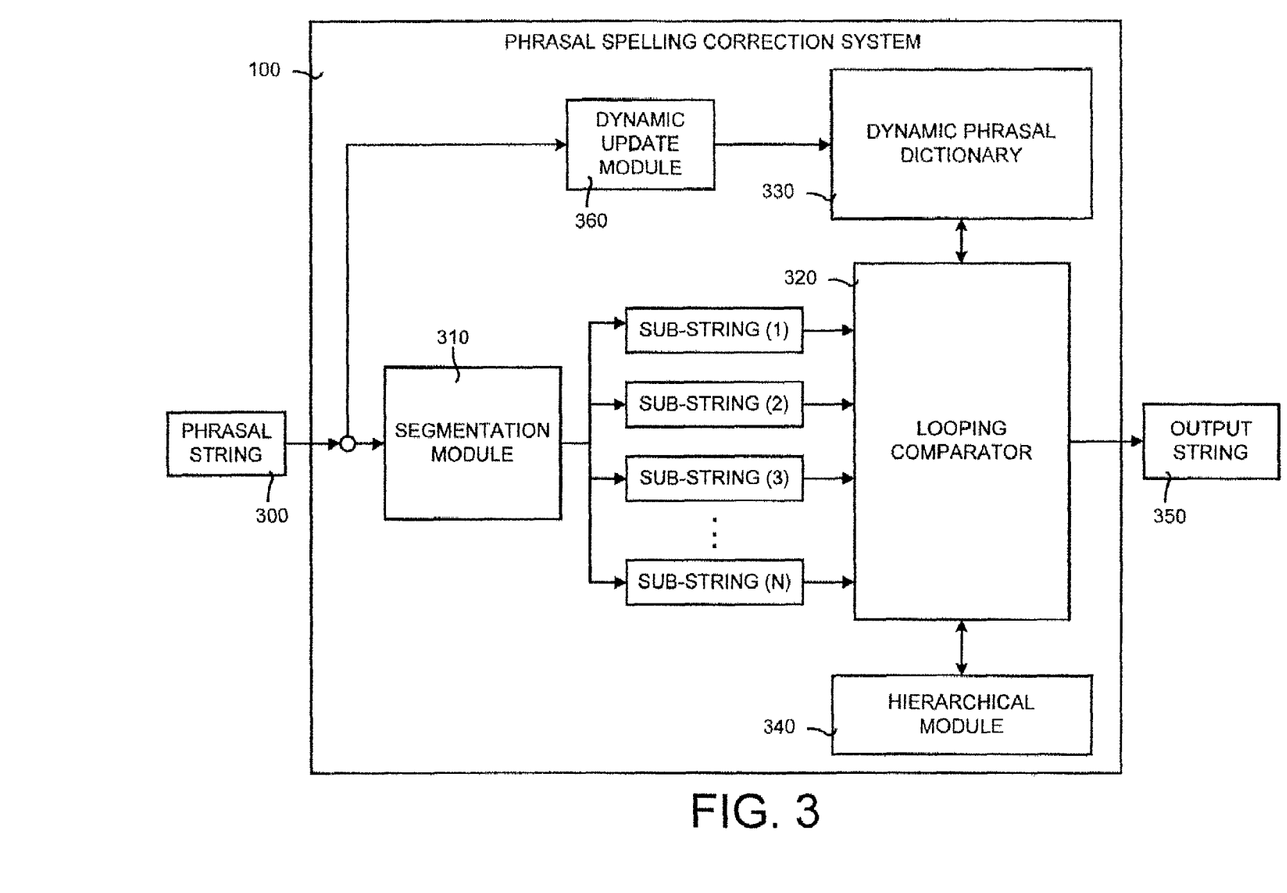
FIG. 3 is a general block diagram illustrating components of the phrasal spelling correction system of FIG. 1 and their interaction.

The present invention includes a phrasal spelling correction system that inputs a phrasal string to be corrected, processes the phrasal string and outputs the most likely correct spelling of the input phrasal string. FIG. 3 is a general block diagram illustrating components of the phrasal spelling correction system 100 of FIG. 1 and their interaction. In particular, a phrasal string 300 is sent to the phrasal spelling correction system 100 and received by a segmentation module 310. The segmentation module 310 segments the phrasal string 300 into a plurality of different possible segmentations. Each of these plurality of segmentations includes sub-strings, shown in FIG. 3 as sub-string (1) to sub-string (N). The segmentation of the phrasal string is a partitioning or dividing of the phrasal string into contiguous sub-strings over the entire phrasal string. For instance, given the string "pintures ff marylinnMonroe", one segmentation is /pintures ff/marylinnMonroe/ consisting of sub-string (1)="pintures ff" and sub-string (2)="marylinnMonroe".

For each segmentation of the phrasal string 300, the sub-strings of that segmentation are processed by a looping comparator 320. As explained in detail below, the looping comparator 320 uses dictionary looping to compare each of the sub-strings to entries in a dynamic phrasal dictionary 330. The dynamic phrasal dictionary 330 contains phrasal strings, and these phrasal strings are capable of including words, phrases, characters and spaces. Using dictionary looping, the looping comparator 320 determines the dictionary entry that most closely matches the sub-string being examined. Preferably, the looping comparator 320 includes a data structure that permits looping through phrasal strings. When the closest matching dictionary entry is found, the looping comparator 320 uses information from a hierarchical module 340 to determine a cost for the match. The cost for each sub-string is added to arrived at a total cost for the segmentation. The matches for each sub-string are combined to produce a corrected segmentation. The corrected segmentation that corresponds to the segmentation having the lowest cost is designated as the most likely correct spelling of the phrasal string 300. This corrected segmentation is sent as an output string 350.

The phrasal spelling correction system 100 also includes a dynamic update module 360 in communication with the dynamic phrasal dictionary 330. The dynamic update module 360 receives the phrasal string 300 and determines whether all or some of the phrasal string 300 should be appended to the dynamic phrasal dictionary 330. There are several techniques that the dynamic update module 360 may use to determine whether to include the all or a portion of the phrasal string 300 in the dictionary 330. Preferably, the dynamic update module 360 determines and tracks the frequency with which a certain phrasal string has been typed and appends to the dictionary 330 those phrasal strings having the highest frequency.

IV. General Operation of the Invention

Figure 4:
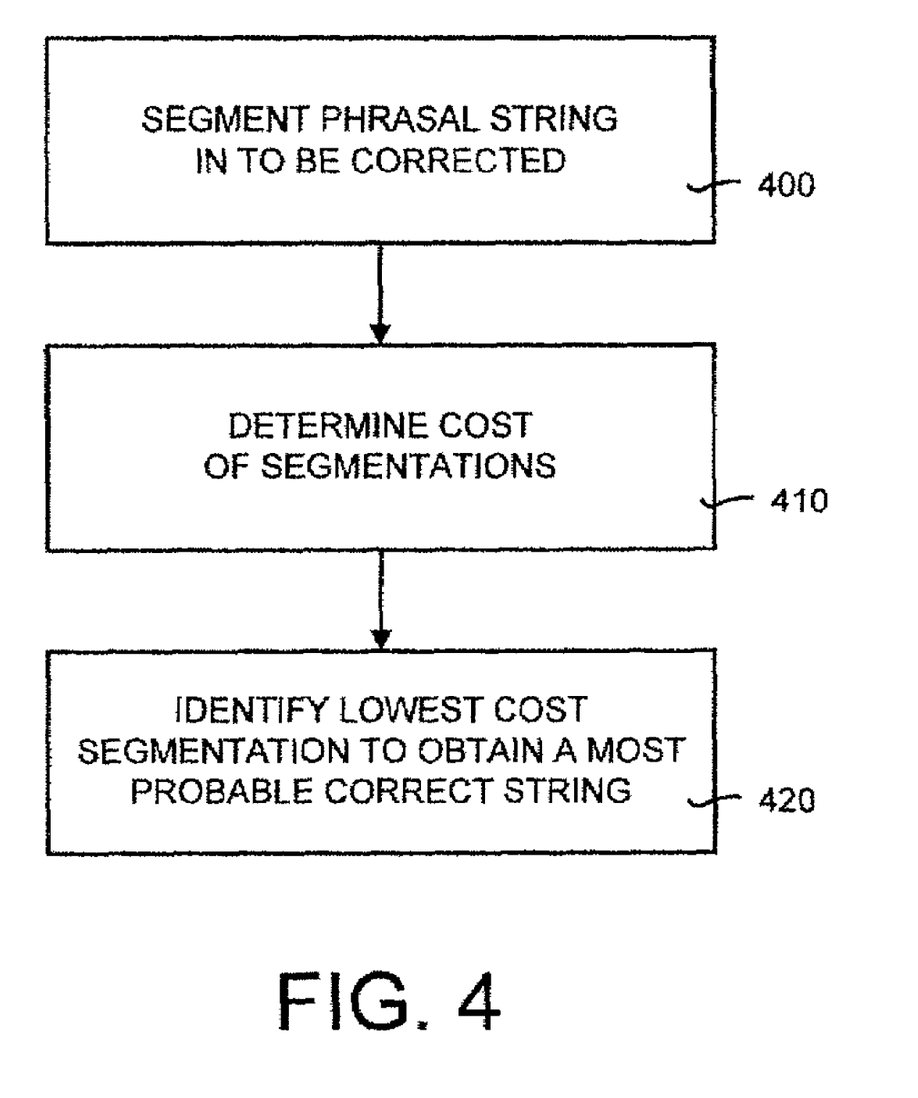
FIG. 4 is a general flow diagram illustrating the general operation of the present invention.

FIG. 4 is a general flow diagram illustrating the general operation of the present invention. In general, the spelling correction method determines a string representing a most probable correct spelling for a phrasal string to be spell corrected. More specifically, the spelling correction method begins by segmenting a phrasal string to be corrected (box 400). Next, a cost is determined for each of the segmentations (box 410). Finally, the segmentation having the lowest cost is identified in order to obtain the most probable correct spelling of the phrasal string (box 420).

Figure 5:
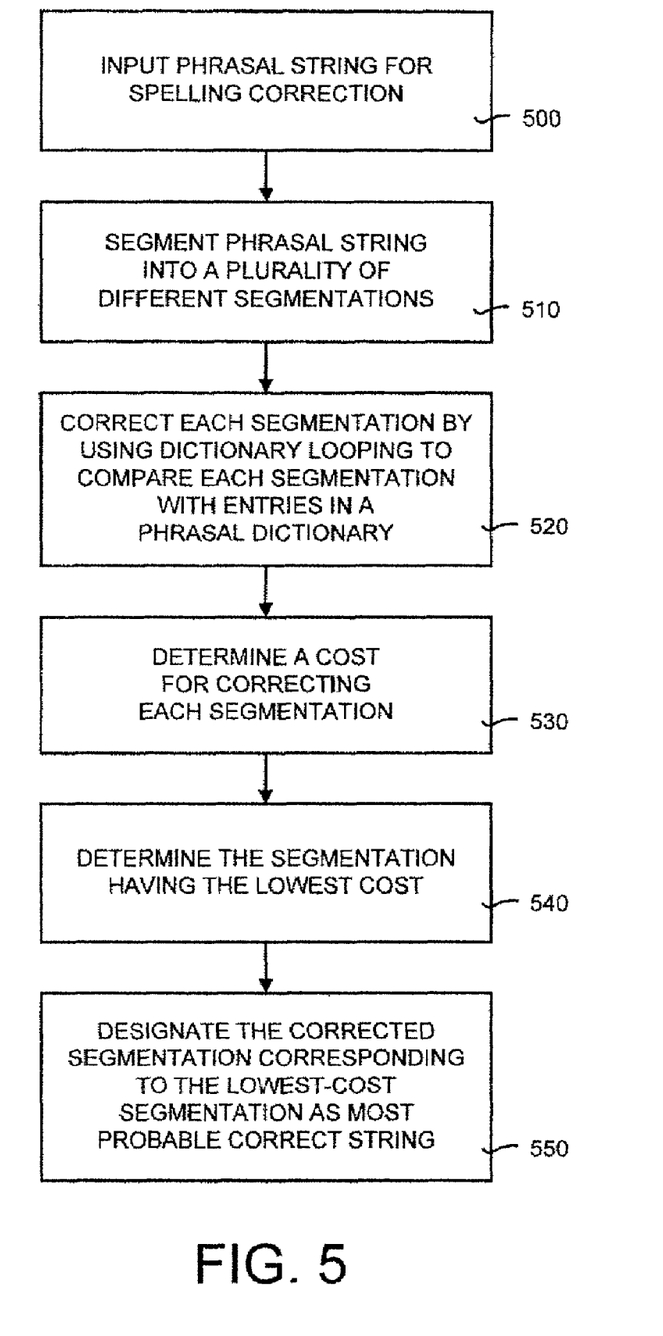
FIG. 5 is a detailed flow diagram illustrating the detailed operation of the present invention.

FIG. 5 is a detailed flow diagram illustrating the detailed operation of the present invention. In particular, a phrasal string to be spell corrected is received as input (box 500). The phrasal string is segmented into a plurality of different segmentations (box 510). This segmentation of the phrasal string is performed by dividing the phrasal string into contiguous sub-strings. It should be noted that these divisions do not need to occur where spaces separate text. Next, each segmentation is corrected using dictionary looping (box 520). As discussed in greater detail below, dictionary looping compares each segmentation with entries in a phrasal dictionary. A cost for correction is then determined for each of the plurality of segmentations (box 530). After a cost has been determined for each segmentation, the segmentation having the lowest cost is determined (box 540). The corrected segmentation having the lowest cost of correction is designated as the most probable correct string for the input phrasal string (box 550). It should be noted that the lowest-cost segmentation may be composed of more than a single corresponding entry in the phrasal dictionary.

Figure 6:
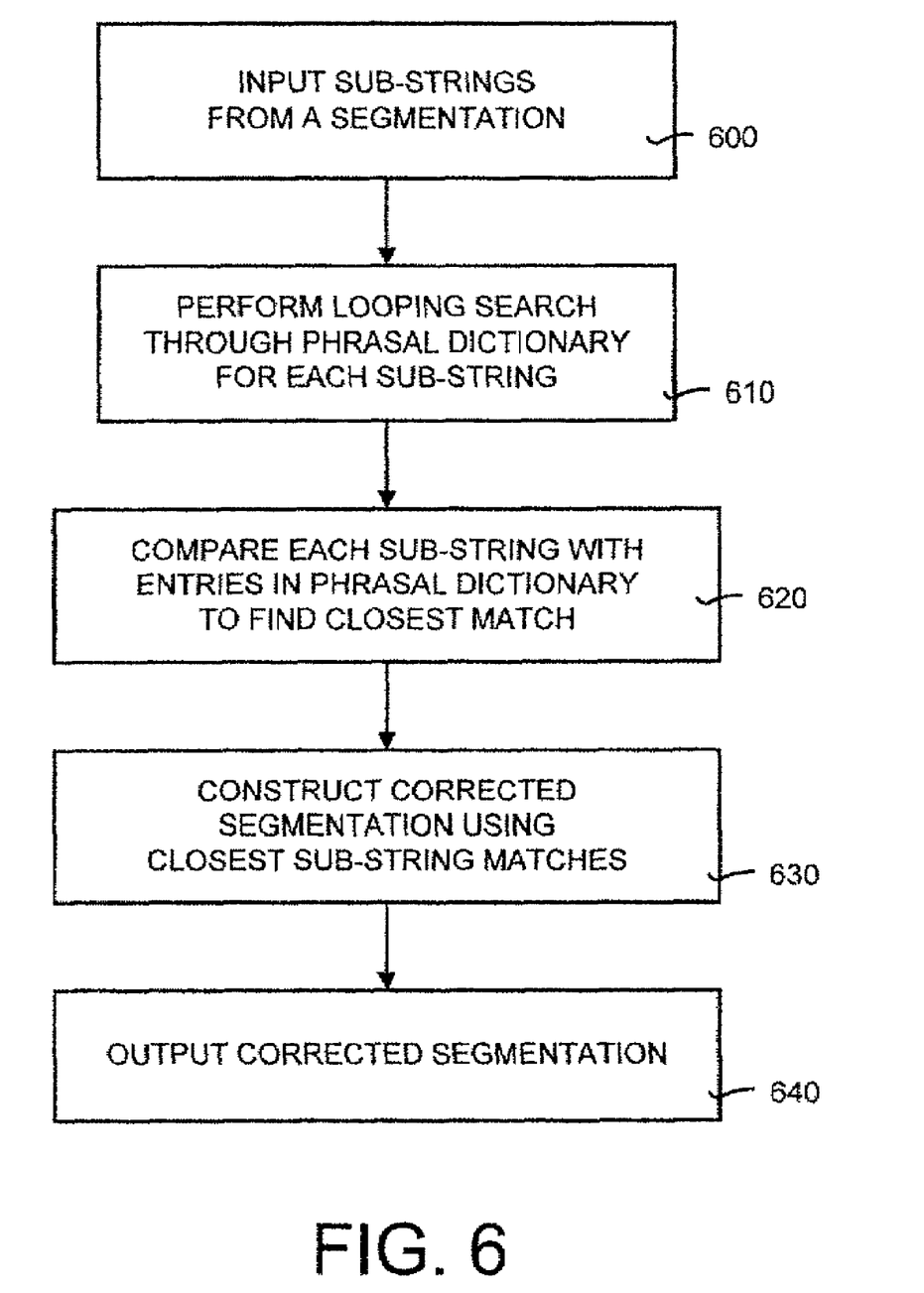
FIG. 6 is a detailed flow diagram illustrating in the dictionary looping operation of the looping comparator 320 shown in FIG. 3.

FIG. 6 is a detailed flow diagram illustrating in the dictionary looping operation of the looping comparator 320 shown in FIG. 3. Dictionary looping allows the dictionary to be compact because the dictionary need not include all potential combinations of all possible phrases that could be encountered. In general, dictionary looping begins by receiving a segmentation to be spell corrected and corrects the segmentation using a phrasal dictionary. More specifically, a segmentation is corrected by first inputting sub-strings of the phrasal string (box 600). For each sub-string, a looping search is performed through the phrasal dictionary (box 610). Preferably, the looping search is performed using a data structure that has the phrasal dictionary stored therein, as discussed in detail below. During this search each sub-string is compared with entries in a phrasal dictionary in order to find the entry that most closely matches the sub-string (box 620). Using these closest sub-string matches a corrected segmentation is constructed (box 630). The corrected segmentation is the output (box 640).

By way of example, suppose that the input phrasal string is "picturesff marilynminro" and the segmentation is /picturesff/marilynminro/. When the sub-string "picturesff" is compared to entries in the phrasal dictionary the phrase "pictures of" will produce the closest match to the sub-string. Similarly, when the sub-string "marilynminro" is compared to entries in the phrasal dictionary the phrase "marilyn monroe" will produce the closest match. A corrected segmentation for the segmentation /picturesff/marilynminro/ is constructed from the closest matches, "pictures of" and "marilyn monroe" such that the corrected segmentation is /pictures of/marilyn monroe/. This corrected segmentation is then sent as output where the cost of correction is determined (box 530) and the rest of the process occurs as shown in FIG. 5.

Figure 7:
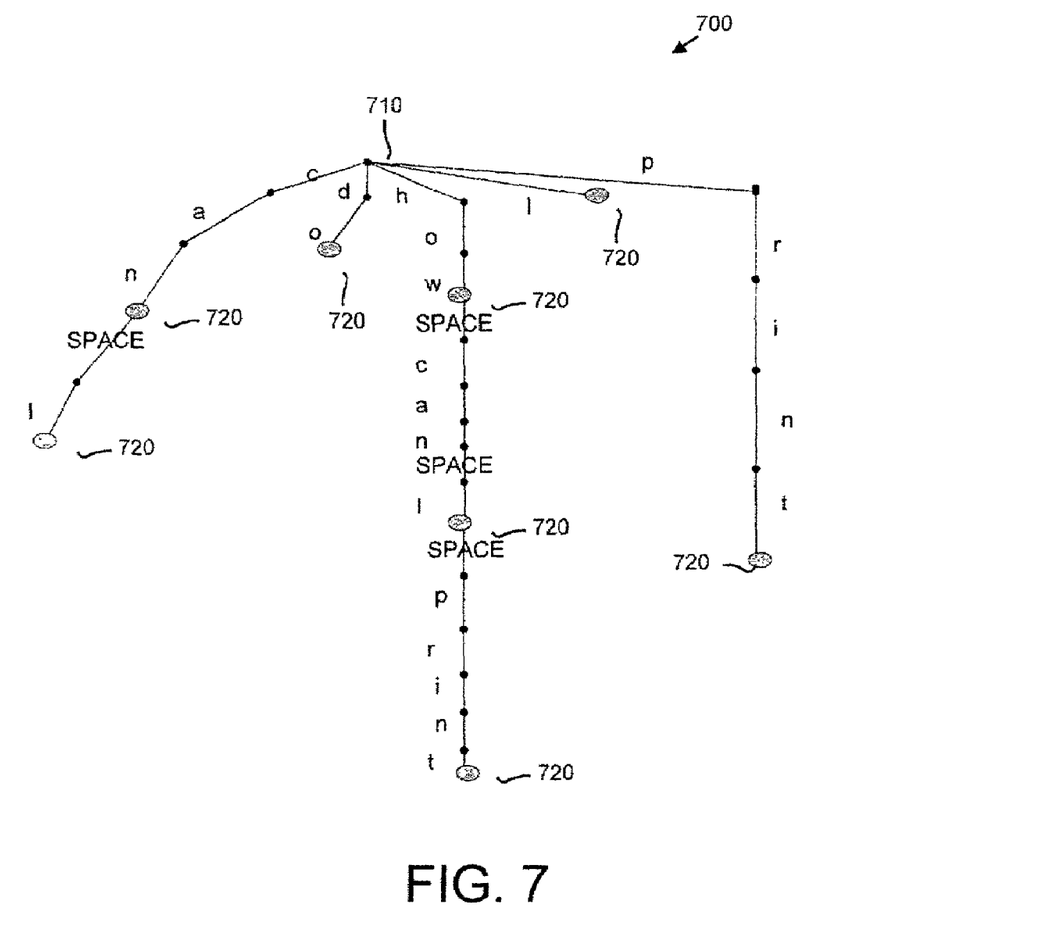
FIG. 7 illustrates a working example of a data structure used by the looping comparator 320 having a phrasal dictionary stored therein and used for dictionary looping.

FIG. 7 illustrates a working example of a data structure used by the looping comparator 320 having a phrasal dictionary stored therein and used for dictionary looping. The data structure shown in FIG. 7 is known as a trie 700. Branches of the trie 700 are represented as paths from a root node 710 to an end node 720. By way of example, the trie 700 shown in FIG. 7 encodes the following strings:

can
can I
do
how
how can I
how can I print
I
print

Note that using the trie 700 the string "how can I print" can be represented.

Referring to FIGS. 6 and 7, the looping comparator 320 can be used to search the trie 700 in a looping manner known as dictionary looping. Dictionary looping is a looping search that is used to find an entry in the phrasal dictionary having a closest match to a sub-string being processed. Every end node 720 on the trie 700 points back to the root node 710. This means that rather than having a space indicate the termination of one pass through the trie 700, the present invention allows looping back in the trie 700 at any place in an input phrasal string. Using this dictionary looping, the looping comparator 320 find a dictionary entry that is a closest match to the sub-string being examined.

In order to determine the cost of correcting a segmentation, matches having a longer lengths are favored. The present invention implements this by using a length-adjusted distance measure. If distance(pictures of, pictures ff)=distance (pictures,pictures)+distance(of,ff), then little would be gained by having multiword phrases in the phrasal dictionary. The present invention avoids this problem by computing an average length-adjusted segment distance. Using standard edit distance, distance(pictures of, pictures ff)=1, distance(pictures,pictures)=0 and distance(of,ff)=1. However, using the average length-adjusted segment distance, distance(pictures of, pictures ff)=1/11, and distance(pictures, pictures)+distance (of,ff)=0/8+1/2. Thus, the longer match is rewarded and assigned a lower cost.

V. Operational Details and Working Example

The operational and technical details of the present invention will now be presented. The method of the present invention begins by selecting an input phrasal string for spelling correction. This phrasal string is then segmented into a plurality of segmentation, with each segmentation containing contiguous sub-strings. It should be noted that one or more of these sub-strings may be empty. If there is no bound on the allowable number of contiguous empty sub-strings in a segmentation, then there are an infinite number of segmentations of any string. On the other hand, if no empty sub-strings are allowed, then a string having n characters has $2^{n-1}$ possible segmentations. Preferably, a small number of empty sub-strings are allowed.

By way of example, if the word "dogs" is the input string the present invention will segments the word into contiguous sub-strings. If no empty sub-strings are allowed, then the number of partitions is equal to 8:

| [t1] | dogs → |d| |o| |g| |s|; | dogs → |d| |og| |s|; |
|---|---|---|
| | dogs → |do| |g| |s|; | dogs → |d| |o| |gs|; |
| | dogs → |do| |gs|; | dogs → |dog| |s|; |
| | dogs → |d| |ogs|; | dogs → |dogs|. |

If empty sub-strings are allowed, then the number of segmentations is infinite and includes, for example,

| [t2] | dogs → |d| |og| |s|; | dogs → |d| |ϵ| |og| |s|; |
|---|---|---|
| | dogs → |d| |o| |g| |s|; | dogs → |d| |ϵ| |ϵ| |og| |s|, | where ϵ denotes an empty sub-string.

A function then is defined that takes a string and a dictionary as inputs and returns a cost. Mathematically, this function may be defined as least_cost (x,D), where string x and a dictionary D are inputs. A number n is returned, with n being the cost for the string x. The number n is represented by the equation:

$$\min_{w \in D} {}^{Dst(x,w)}$$

for some predefined distance measure Dst, and is the smallest cost between x and some string w in the dictionary D. The function least_cost_string(x,D) is defined as:

$$\arg\min_{w \in D} {}^{Dst(x,w)}$$

The present invention may be implemented as follows. Assume an input string S consisting of a sequence of characters (including spaces) c1 c2 ... cn, and a dictionary D. For each segmentation (or partition P) of the input string S, a score is assigned:

$$Score(P, S) = \sum_{p \in P} \text{least\_cost}(p, D)$$

For a partition P' for which Score(P',S) is smallest
For i=1 to number of partitions in P'
If least_cost_string($p_i$,D)=$p_i$ then do nothing
Else suggest least_cost$_{1 3}$ string($p_i$,D) as a correction for $p_i$ This algorithm works regardless of whether the dictionary D contains multi-word entries. Instead of suggesting a single correction, the system could also return the x most likely corrections by returning the x strings in D that are closest to $p_i$ instead of just returning the single closest string.

Two working examples will now be presented. It should be noted that these working examples are exemplary and many other implementations of the present invention are possible. In these working examples the dictionary D only contains single words. In a first working example, the user types the phrase: "pict uresof monstar trucks". One possible segmentation of this string would be:

/pict ures/of/monstar/trucks/

The score for this particular partition would be:

least_cost("pict ures",D)+cost of adding a space+least_cost("of",D)+least_cost ("monstar",D)+least_cost ("trucks",D)

Once this is chosen as the segmentation having the lowest score, then the corresponding corrections are:

least_cost_string("pict ures",D)="pictures";
least_cost_string("of",D)=of;
least_cost_string("monstar",D)="monster"; and
least_cost_string("trucks",D)=trucks.

Therefore, the present invention would suggest that the original user input of "pict uresof monstar trucks" be rewritten as "pictures of monster trucks".

In another example, the user has entered the above string as "pict uresof monstair trucks". It is unlikely that least cost_string("monstair",D) will be "monster", so it is likely that this misspelled word will have spelling correction incorrectly performed. However, if the phrase "monster trucks" appears in the phrasal dictionary of the present invention, then the best scoring (i.e. lowest cost) segmentation would likely be:

pict ures/of/monstair trucks/ with the corresponding corrections:

least_cost_string("pict ures",D)="pictures";
least_cost_string("of",D)=of;
least_cost_string("monstair trucks",D)="monster trucks".

The partition P can be found more efficiently using numerous efficiency techniques for dictionary searching. These searching efficiency techniques are well known to those having ordinary skill in the art. By way of example, one such searching efficiency technique is a beam search. The preferred implementation of performing the searching, however, is to perform looping through a trie. This type of dictionary searching is explained in detail above.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for spelling correction of a phrasal string, comprising:
    segmenting the phrasal string into a plurality of different segmentations, the plurality of different segmentations including contiguous sub-strings over the phrasal string;
    using dictionary looping to spell correct each of the plurality of different segmentations;
    determining a cost associated with each of the sub-strings in each of the plurality of different segmentations, each of the contiguous sub-strings containing a plurality of words; and
    identifying a segmentation having a lowest total cost corresponding to a most probable correct spelling of the phrasal string by adding a cost for each of the sub-strings of a segmentation to arrive at a total cost for that segmentation, wherein a sub-string having a longer length than another shorter sub-string is assigned a lower cost while the shorter sub-string is assigned a higher cost.

2. The method as set forth in claim 1, wherein dictionary looping further comprises comparing each of the plurality of different segmentations with entries in a phrasal dictionary.

3. The method as set forth in claim 2, wherein the phrasal dictionary is capable of containing phrasal strings including phrases, words and spaces.

4. The method as set forth in claim 1, wherein the cost is a cost of correcting each of the plurality of different segmentations.

5. The method as set forth in claim 1, further comprising spell correcting sub-strings of a segmentation using dictionary looping.

6. The method as set forth in claim 5, wherein dictionary looping further comprises performing a looping search through a phrasal dictionary to compare each of the sub-strings with entries in the phrasal dictionary to find an entry having a closest match.

7. The method as set forth in claim 6, further comprising constructing a corrected segmentation using the closest match for each of the sub-strings.

8. A computer-readable medium containing computer-executable instructions for performing the process recited in claim 1.

9. A method for spelling correction of a misspelled phrasal string containing words, spaces and characters, comprising:
    receiving the misspelled phrasal string;
    dividing the misspelled phrasal string into a plurality of segmentations containing sub-strings having a plurality of words;
    comparing each of the of the sub-strings in each of the plurality of segmentations to entries in a dictionary to obtain a cost for each of the sub-strings; and
    determining a best segmentation from the plurality of segmentations that represents the most probable correct spelling of the misspelled phrasal string by adding together the cost of each of the sub-strings for a segmentation to obtain a total cost for the segmentation, wherein the best segmentation has a lowest total cost, and wherein a sub-string having a longer length when compared to another sub-strings is assigned a lower cost while the other sub-strings having a shorter length are assigned a higher cost.

10. The method as set forth in claim 9, wherein each of the plurality of segmentations contains contiguous sub-strings.

11. The method as set forth in claim 10, wherein comparing each of the plurality of segmentations to entries in a dictionary is performed by finding a closest match between sub-strings of a segmentation and a dictionary entry.

12. The method as set forth in claim 9, further comprising determining a cost associated with each segmentation.

13. The method as set forth in claim 12, wherein the best segmentation is a segmentation having a lowest cost.

14. The method as set forth in claim 12, wherein hierarchical parameters are used to determine the cost associated with each segmentation.

15. The method as set forth in claim 14, wherein the hierarchical parameters include at least one of: (a) a length of a dictionary entry; (b) a probability of a dictionary entry given a context of neighboring words of the phrasal string.

16. A phrasal spelling correction system for spelling correction of a phrasal string, comprising:
    a segmentation module that divides the phrasal string into a plurality of segmentations, each of the plurality of segmentation containing sub-strings containing a plurality of words;
    a looping comparator that performs dictionary looping to correct a segmentation by looping through a dictionary and comparing each of the sub-strings of the segmentation with entries in the dictionary to determine a closest match and a cost for each of the sub-strings and adds the cost of each sub-string to arrive at a total cost for the segmentation; and
    an output string containing a corrected segmentation having the lowest total cost that represents a correct spelling of the phrasal string, wherein a sub-string having a longer length than other sub-strings is assigned a lower cost over the other sub-strings having a shorter length, while the other sub-strings having a shorter length are assigned a higher cost.

17. The phrasal spelling correction system as set forth in claim 16, wherein the looping comparator determines a cost associated with each of the plurality of segmentations.

18. The phrasal spelling correction system as set forth in claim 17, further comprising a hierarchical module that provide hierarchical parameters to the looping comparator to determine the cost.

19. The phrasal spelling correction system as set forth in claim 18, wherein the hierarchical parameters include a length of a dictionary entry and a probability of a dictionary entry given a context of neighboring words of the phrasal string.

20. The phrasal spelling correction system as set forth in claim 16, wherein the dictionary is a dynamic phrasal dictionary containing phrasal strings capable of containing words, phrases, characters and spaces.

21. The phrasal spelling correction system as set forth in claim 20, further comprising a dynamic update module that provides dynamic updating of phrasal dictionary entries.

22. A method for spelling correction of a phrasal string, comprising:
   segmenting the phrasal string into a plurality of different segmentations containing sub-strings having a plurality of words;
   using dictionary looping to perform a plurality of different searches through a dictionary data structure such that each of the different searches begins at a starting node and continually loops back to the starting node to begin another search in order to compare each of the sub-strings with entries in the dictionary data structure to assign a cost to each of the sub-strings;
   determining a cost for correction associated with each of the plurality of different segmentations by adding a cost of each of the sub-strings of a segmentation to arrive at the cost of correction, wherein a sub-string having a longer length is assigned a lower cost as compared to other sub-strings having a shorter length; and
   identifying a segmentation having a lowest cost of correction corresponding to a most probable correct spelling of the phrasal string.

23. A method for spelling correction of a misspelled phrasal string containing words, spaces and characters, comprising:
   dividing the misspelled phrasal string into a plurality of different segmentations containing sub-strings containing a plurality of words;
   performing dictionary looping of a trie containing a phrasal dictionary to search for each of the sub-strings in the trie;
   comparing each of the sub-strings to entries in the trie to find a closest match between a sub-string and a dictionary entry to determine a cost for each of the sub-strings;
   summing the cost for each sub-string in a segmentation to determine a total cost for the segmentation;
   constructing a corrected phrasal string using a segmentation having the lowest total cost, wherein a sub-string having a longer length is assigned a lower cost than other sub-strings having a shorter length, while the other sub-strings having a shorter length are assigned a higher cost.

24. The method of claim 23, further comprising dividing the misspelled phrasal string into all possible segmentations.

* * * * *

UNITED STATES PATENT AND TRADEMARK OFFICE
CERTIFICATE OF CORRECTION

PATENT NO. : 7,076,731 B2  Page 1 of 1
APPLICATION NO. : 09/681771
DATED : July 11, 2006
INVENTOR(S) : Brill et al.

It is certified that error appears in the above-identified patent and that said Letters Patent is hereby corrected as shown below:

In column 6, line 61, delete "marilyn/minr" and insert -- marilyn/minro/; and (4)/ picturesff marilynminro/. --, therefor.

In column 9, line 30, delete ""pintures" and insert -- "pictures --, therefor.

In column 9, line 31, delete "/pintures" and insert -- /pictures --, therefor.

In column 9, line 32, delete ""pintures ff" and insert -- "pictures ff" --, therefor.

In column 12, line 43, delete "least_cost$_{13}$ string(p$_i$,D)" and insert -- least_cost_string(p$_i$,D) --, therefor.

In column 14, line 49, delete "comprising:" and insert -- comprising: a general purpose computing device; computer-executable instructions comprising program modules executable by the computing device, wherein the program modules comprise: --, therefor.

Signed and Sealed this

Sixth Day of April, 2010

David J. Kappos
*Director of the United States Patent and Trademark Office*